J. F. SECORD.
Chain-Pump Bucket.

No. 216,463. Patented June 10, 1879.

WITNESSES:
Henry N. Miller
C. Sedgwick

INVENTOR:
J. F. Secord
BY Munn & Co
ATTORNEYS.

UNITED STATES PATENT OFFICE.

JOHN F. SECORD, OF NORTH GREENWICH, CONNECTICUT.

IMPROVEMENT IN CHAIN-PUMP BUCKETS.

Specification forming part of Letters Patent No. 216,463, dated June 10, 1879; application filed November 26, 1878.

*To all whom it may concern:*

Be it known that I, JOHN F. SECORD, of North Greenwich, in the county of Fairfield and State of Connecticut, have invented a new and useful Improvement in Chain-Pump Buckets, of which the following is a specification.

Figure 3:
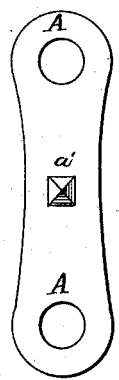
Figure 1:
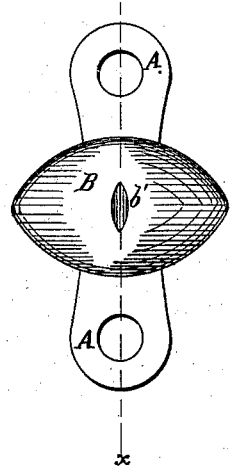
Figure 2:
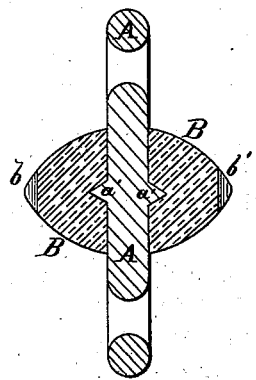

Figure 1 is a side view of one of my improved buckets. Fig. 2 is a longitudinal section of the same, taken through the line $x$ $x$, Fig. 1. Fig. 3 is a detail side view of the link.

Similar letters of reference indicate corresponding parts.

The object of this invention is to furnish an improved bucket for chain-pumps which shall be so constructed as to adjust itself to the size of the pipe, and cannot be pressed out of shape or collapsed.

The invention consists in an improved chain-pump bucket formed of a rubber knob, molded solid upon an iron link, as hereinafter fully described.

A is a link of the pump-chain, which is made flat, and with holes in its ends to receive the connecting or intermediate links. Upon the middle part of the link A is molded a solid knob, B, of rubber, and which may be made of such a size as the desired capacity of pump may require. Upon the sides of the link A are formed points or spurs $a'$, to prevent the rubber knob B from slipping out of place upon the link A. In the opposite sides of the knob B are formed small grooves $b'$, made longitudinally with the link A, so that when the pump is stopped the water above the buckets in the pipe may flow back, and may thus be prevented from standing in the said pipe.

I am aware that the use of rubber buckets is not new; but hitherto they have been open to the objection of turning wrong side out whenever the wheel is run backward. This is obviated by my invention.

I am also aware that a rubber bucket or valve has been recessed to receive a tapering plate, and been provided with grooves on its under side to allow the water to pass through when the pump is not in use.

Having thus described my invention, I claim as new and desire to secure by Letters Patent—

An improved chain-pump bucket formed of a rubber knob, B, molded solid upon an iron link, A, substantially as herein shown and described.

JOHN FRANKLIN SECORD.

Witnesses:
    JAMES F. WHITE,
    TIM J. DONOVAN.